(12) United States Patent
Shigeta et al.

(10) Patent No.: US 9,229,533 B2
(45) Date of Patent: Jan. 5, 2016

(54) INFORMATION PROCESSING APPARATUS, METHOD, AND PROGRAM FOR GESTURE RECOGNITION AND CONTROL

(75) Inventors: Osamu Shigeta, Tokyo (JP); Takuro Noda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 343 days.

(21) Appl. No.: 13/015,120

(22) Filed: Jan. 27, 2011

(65) Prior Publication Data

US 2011/0216075 A1 Sep. 8, 2011

(30) Foreign Application Priority Data

Mar. 8, 2010 (JP) .................................. 2010-050630

(51) Int. Cl.
*G06F 3/01* (2006.01)
*G06F 3/048* (2013.01)

(52) U.S. Cl.
CPC ................ *G06F 3/017* (2013.01); *G06F 3/048* (2013.01)

(58) Field of Classification Search
CPC ..... G06F 3/017; G06F 3/04883; G06F 3/048; G06F 3/016; G06F 3/0481; G06F 1/1616; G06T 5/40
USPC ............................ 715/863; 345/156; 382/168
See application file for complete search history.

(56) References Cited

U.S. PATENT DOCUMENTS

| 6,160,899 | A  | * | 12/2000 | Lee et al. ........................ 382/103 |
| 7,783,983 | B1 | * | 8/2010  | Mayers et al. ................. 715/764 |
| 7,840,912 | B2 | * | 11/2010 | Elias et al. .................... 715/863 |
| 8,060,063 | B1 | * | 11/2011 | Wageman ................... 455/412.2 |
| 2005/0210418 | A1 | * | 9/2005 | Marvit et al. .................. 715/863 |
| 2006/0210958 | A1 | * | 9/2006 | Rimas-Ribikauskas et al. ............................. 434/362 |
| 2007/0098263 | A1 | * | 5/2007 | Furukawa et al. ............ 382/181 |
| 2008/0126937 | A1 | * | 5/2008 | Pachet ........................... 715/720 |
| 2008/0163130 | A1 | * | 7/2008 | Westerman .................... 715/863 |
| 2008/0168404 | A1 | * | 7/2008 | Ording ............................ 715/863 |
| 2009/0191968 | A1 | * | 7/2009 | Johnson et al. .................. 463/37 |
| 2010/0122167 | A1 | * | 5/2010 | Ryu ................................ 715/716 |
| 2010/0281432 | A1 | * | 11/2010 | Geisner et al. ................ 715/849 |
| 2011/0102570 | A1 | * | 5/2011 | Wilf et al. ........................ 348/77 |

FOREIGN PATENT DOCUMENTS

JP 2008-282092 11/2008

OTHER PUBLICATIONS

U.S. Appl. No. 13/14,953, filed Jan. 27, 2011, Shigeta, et al.

* cited by examiner

*Primary Examiner* — Jennifer To
*Assistant Examiner* — Li Sun
(74) *Attorney, Agent, or Firm* — Oblon, McClelland, Maier & Neustadt, L.L.P.

(57) ABSTRACT

An information processing apparatus includes a detection unit configured to detect a gesture made by a user, a recognition unit configured to recognize a type of the gesture detected by the detection unit, a control unit configured to control operation of a first application and a second application, and an output unit configured to output information of the first application or the second application. If the gesture is recognized by the recognition unit while the control unit is controlling the operation of the first application in the foreground, the control unit controls the operation of the second application operating in the background of the first application on the basis of the type of the gesture recognized by the recognition unit.

17 Claims, 17 Drawing Sheets

FIG. 8

| GESTURE COMMAND | OPERATION CONTENT |
|---|---|
| LEFT FLICK | CHANGE TO NEXT SONG |
| RIGHT FLICK | CHANGE TO PREVIOUS SONG |
| HOLD UP HAND | SWITCHING BETWEEN PLAYBACK AND STOP |
| DRAW DOUBLE CIRCLE CLOCKWISE | REGISTRATION TO FAVORITE |
| DRAW DOUBLE CIRCLE COUNTERCLOCKWISE | REMOVAL FROM FAVORITE |
| WAVE HAND | SWITCHING OF MODE |
| MOVE HAND UP AND DOWN | RANDOM SELECTION OF SONG |

FIG. 13

| GESTURE COMMAND | DISPLAY CONTENT |
|---|---|
| LEFT FLICK | MOVE SONG LIST TO LEFT BY ONE JACKET PICTURE |
| RIGHT FLICK | MOVE SONG LIST TO RIGHT BY ONE JACKET PICTURE |
| HOLD UP HAND | DISPLAY PLAYBACK OR STOP ICON |
| DRAW DOUBLE CIRCLE CLOCKWISE | ATTACH FAVORITE ICON TO JACKET PICTURE |
| DRAW DOUBLE CIRCLE COUNTERCLOCKWISE | REMOVE FAVORITE ICON FROM JACKET PICTURE |
| WAVE HAND | DISPLAY IN FEEDBACK MODE OR NORMAL MODE |
| MOVE HAND UP AND DOWN | DISPLAY SONG SELECTED AT RANDOM |

INFORMATION PROCESSING APPARATUS, METHOD, AND PROGRAM FOR GESTURE RECOGNITION AND CONTROL

BACKGROUND OF THE INVENTION

1. Field of the Invention

The present invention relates to an information processing apparatus and method, and a program, and more particularly to an information processing apparatus and method, and a program that are configured to operate an application executed in the background on the basis of gestures.

2. Description of the Related Art

For personal computers and mobile phones incorporating cameras, a technology for controlling an application by recognizing gestures made by a user is proposed.

FIG. 1 illustrates an example of a personal computer 221 according to the related art that operates an application on the basis of gestures.

In the personal computer 221 illustrated in FIG. 1, a controller 241 is displayed on a display 222 along with a mirror image 242 captured by a camera 223.

A hand 261 of the user is recognized by the camera 223, and each button on the controller 241 is selected on the basis of the position and the shape of the user's hand 261. Through this selection, an application that is displaying an image 243 on the display 222 is controlled.

In addition, in Japanese Unexamined Patent Application Publication No. 2008-282092, there is proposed an information processing apparatus that displays a gesture input list for a pen device or a mouse device when there has been no input for a certain period of time since operation start or when a gesture input has failed, so as to allow a user to learn gesture commands.

SUMMARY OF THE INVENTION

However, in the technique according to the related art, an image corresponding to an application displayed in the foreground of the display 222 is controlled by gestures.

Therefore, in the technique according to the related art, an application to be controlled may not be controlled on the basis of gestures until an image corresponding to the application is displayed in the foreground of the display 222.

It is desirable to be able to operate an application that is not displayed in the foreground of a display on the basis of gestures.

An information processing apparatus according to an embodiment of the present invention includes detection means for detecting a gesture made by a user, recognition means for recognizing a type of the gesture detected by the detection means, control means for controlling operation of a first application and a second application, and output means for outputting information of the first application or the second application. If the gesture is recognized by the recognition means while the control means is controlling the operation of the first application in the foreground, the control means controls the operation of the second application operating in the background of the first application on the basis of the type of the gesture recognized by the recognition means.

The information processing apparatus may further include determination means for determining whether or not the recognized gesture exists. In a normal mode in which the information of the first application is output, when it is determined by the determination means that the recognized gesture does not exist, the control means may switch the normal mode to a feedback mode, where operation information regarding the gesture is fed back to the user.

The information processing apparatus may further include inference means for inferring the type of the gesture by analogy when it is determined by the determination means that the recognized gesture does not exist. The control means may cause the output means to output feedback information for learning the gesture corresponding to the type of the gesture inferred by the inference means.

The feedback information may be a moving image or an animation of the inferred gesture.

The control means may switch the normal mode and the feedback mode when the user has performed an operation corresponding to a certain gesture.

In the feedback mode, the output means may output a mirror image of the user captured upon the detection by the detection means and a list of gestures as the operation information.

In the normal mode, when the operation of the second application is controlled on the basis of the gesture, the output means may output information corresponding to a control result based on the gesture for a certain period of time.

The output means may output audio information as the information corresponding to the control result based on the gesture.

When switching to the feedback mode has been performed, the output means may display an image of the feedback mode superimposed on an image of the first application in a semitransparent manner.

When switching to the feedback mode has been performed, the output means may display an image of the feedback mode in a region that is part of an image of the first application.

An information processing method according to an embodiment of the present invention includes the steps of detecting a gesture made by a user, recognizing a type of the gesture detected in the step of detecting, controlling operation of a first application and a second application, and outputting information of the first application or the second application. If the gesture is recognized in the step of recognizing while the operation of the first application is being controlled in the foreground in the step of controlling, the step of controlling controls the operation of the second application operating in the background of the first application on the basis of the type of the gesture recognized in the step of recognizing.

A program according to an embodiment of the present invention is a program for causing a computer to execute the steps of detecting a gesture made by a user, recognizing a type of the gesture detected in the step of detecting, controlling operation of a first application and a second application, and outputting information of the first application or the second application. If the gesture is recognized in the step of recognizing while the operation of the first application is being controlled in the foreground in the step of controlling, the step of controlling controls the operation of the second application operating in the background of the first application on the basis of the type of the gesture recognized in the step of recognizing.

According to an embodiment of the present invention, a gesture made by a user is detected, a type of gesture detected is recognized, and the operation of a first application and a second application is controlled. Information of the first application or the second application is output. If the gesture is recognized while the operation of the first application is being controlled in the foreground, the operation of the second application operating in the background of the first application is controlled on the basis of the type of gesture recognized.

According to embodiments of the present invention, it is possible to easily control the operation of an application operating in the background on the basis of gestures.

BRIEF DESCRIPTION OF THE DRAWINGS

FIG. 8 is a diagram illustrating relationships between gesture commands and operation contents;

FIG. 13 is a diagram illustrating relationships between gesture commands and display contents;

DESCRIPTION OF THE PREFERRED EMBODIMENTS

Figure 1:
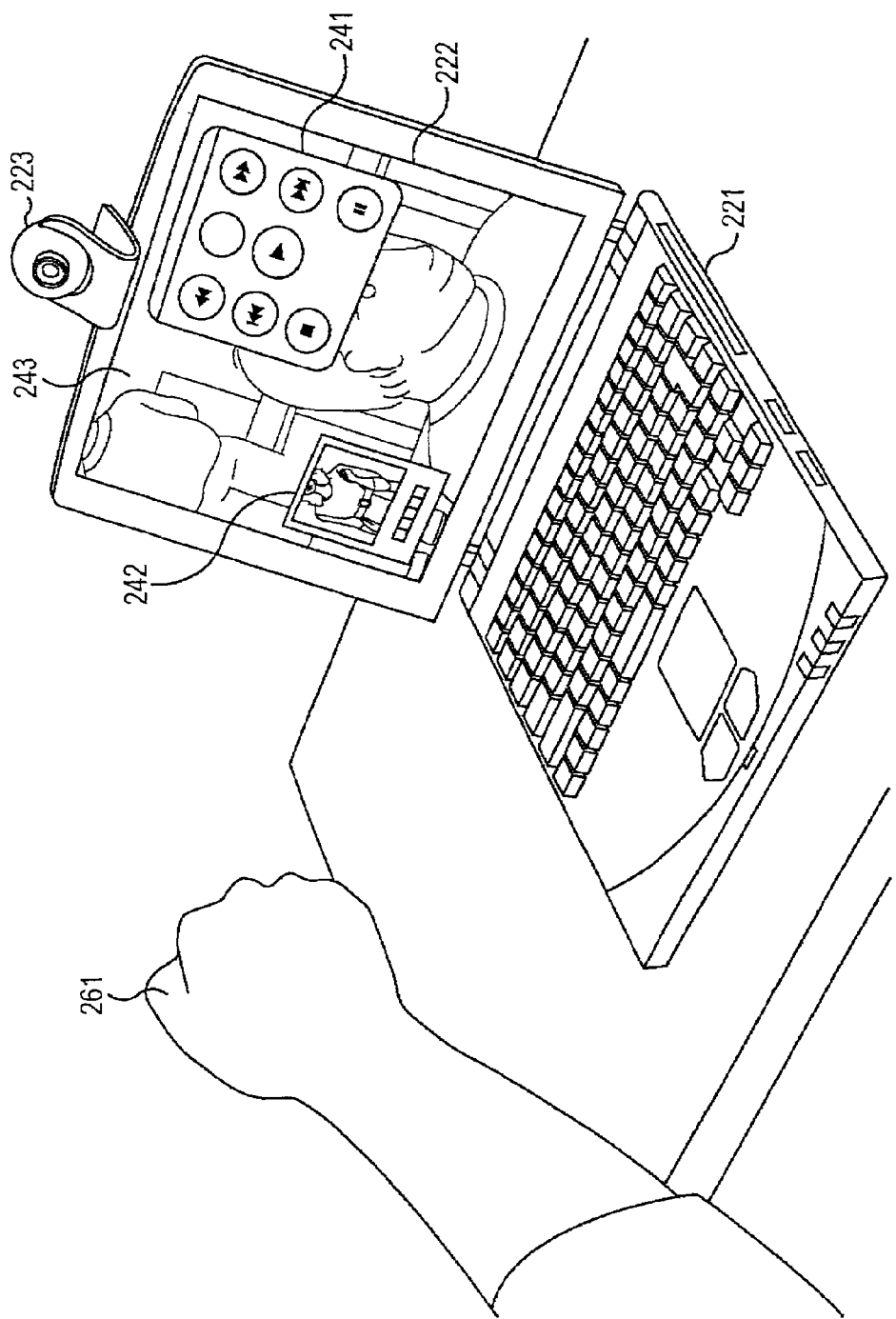
FIG. 1 is a diagram describing an operation controlled by gesture remote control according to a related art.
Figure 2:
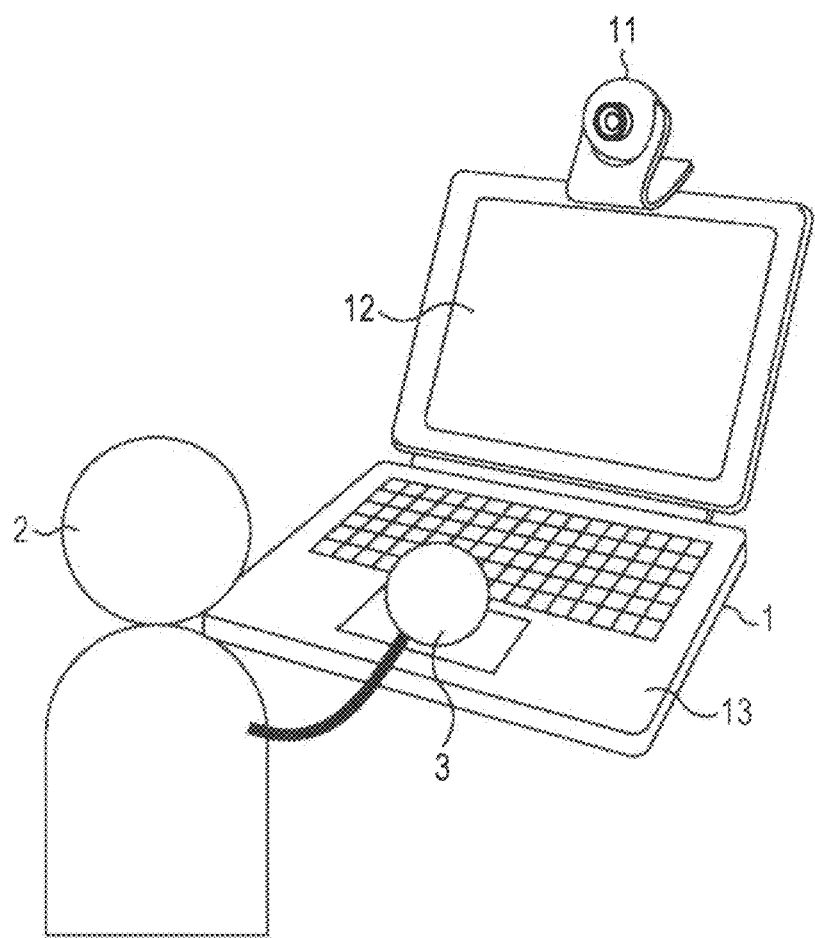
FIG. 2 is a diagram illustrating an external configuration of a personal computer.

FIG. 2 is a diagram illustrating a configuration example of a personal computer 1 according to an embodiment of the present invention.

The personal computer 1 illustrated in FIG. 2 includes a body 13 and a display 12 on which a camera 11 is mounted. The camera 11 captures a still image or a moving image that may be obtained by a monocular camera, a stereo camera, an infrared camera, or the like.

Figure 3:
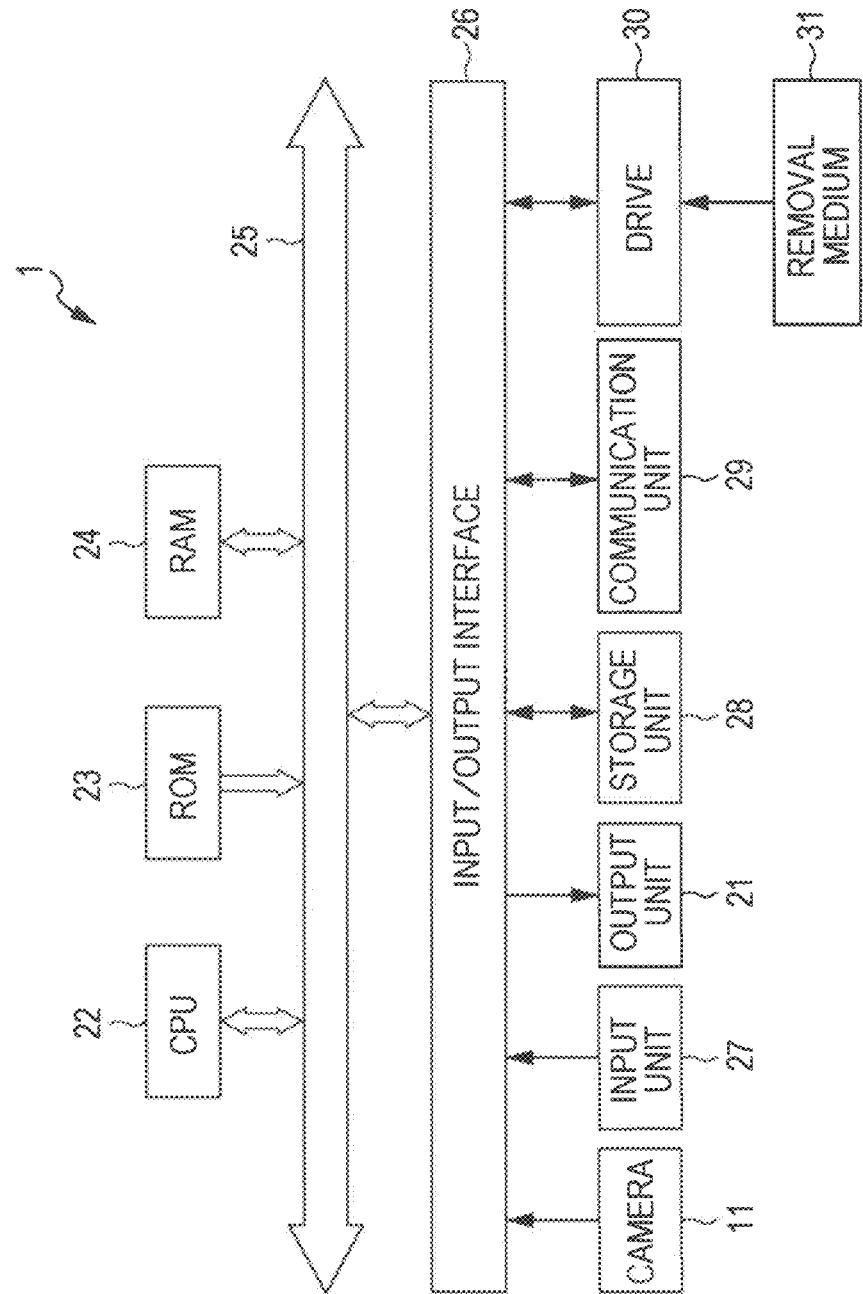
FIG. 3 is a block diagram illustrating a configuration example of hardware of a personal computer according to an embodiment of the present invention.

When a user 2 makes a gesture in three-dimensional space using his/her hand 3, an image of the gesture is captured by the camera 11. The gesture is recognized on the basis of the image captured, and control corresponding to the type of gesture recognized is executed. Thus, the user 2 can control not an application corresponding to an image displayed on the display 12, that is, not an application operating in the foreground, but an application operating in the background.
Configuration of Personal Computer FIG. 3 is a block diagram illustrating a configuration example of hardware of the personal computer 1.

In the personal computer 1, a CPU 22, a read only memory (ROM) 23, and a random access memory (RAM) 24 are connected to one another by a bus 25. An input/output interface 26 is further connected to the bus 25. The camera 11 including a web camera, an input unit 27 including a keyboard, a touch panel, a touch pad, a pen device, a mouse, and a microphone, the display 12, an output unit 21 including a speaker (not illustrated), and a storage unit 28 including a hard disk and a non-volatile memory are connected to the input/output interface 26. Furthermore, a communication unit 29 including a network interface and a drive 30 that drives a removable medium 31 such as a magnetic disk, an optical disk, a magneto-optical disk, or a semiconductor memory are connected to the input/output interface 26.

In the personal computer 1 configured as described above, for example, the CPU 22 executes a program stored in the storage unit 28 by loading the program into the RAM 24 through the input/output interface 26 and the bus 25, in order to execute the series of processes described above. A program to be executed by the personal computer 1 (CPU 22) may be, for example, recorded on the removable medium 31 that is a magnetic disk (includes a flexible disk) and provided. The program may be recorded on the removable medium 31 that is a package medium and provided. As a package medium, an optical disk (a compact disc-read only memory (CD-ROM), a digital versatile disc (DVD), or the like), a magneto-optical disk, a semiconductor memory, or the like is used. Alternatively, the program may be provided through a wired or wireless communication medium such as a local area network, the Internet, or digital satellite broadcasting. The program can then be installed in the storage unit 28 through the input/output interface 26 by inserting the removable medium 31 into the drive 30. In addition, the program can be installed in the storage unit 28 by receiving the program with the communication unit 29 through a wired or wireless communication medium. Alternatively, the program can be installed in the ROM 23 or the storage unit 28 in advance.

The program to be executed by the personal computer 1 may be a program that is chronologically subjected to the processing in an order described herein, or may be a program that is subjected to the processing at a necessary time such as when a call is made.

Figure 4:
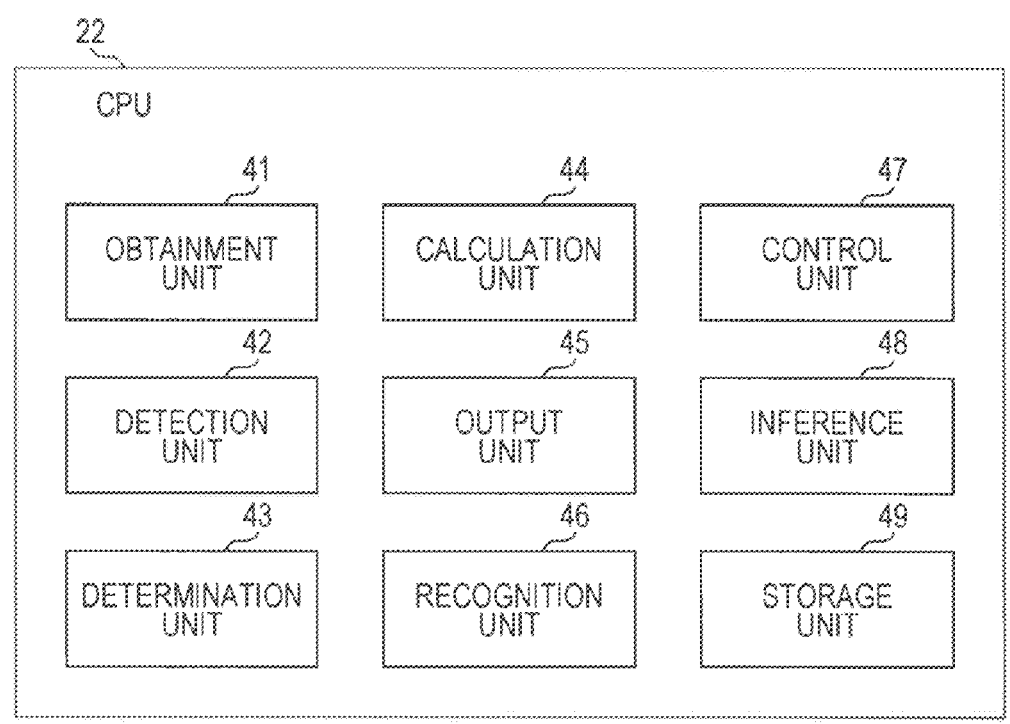
FIG. 4 is a block diagram illustrating an example of the functional configuration of a central processing unit (CPU)

FIG. 4 is a block diagram illustrating an example of the functional configuration of the CPU 22.

The CPU 22 includes an obtainment unit 41, a detection unit 42, a determination unit 43, a calculation unit 44, an output unit 45, a recognition unit 46, a control unit 47, an inference unit 48, and a storage unit 49. It is to be noted that the blocks of the CPU 22 are configured to be able to provide/receive a signal to/from one another as necessary.

The obtainment unit 41 of the CPU 22 obtains information from the camera 11, the input unit 27, or the storage unit 28. The detection unit 42 as detection means detects the region of a hand from the image captured by the camera 11. The determination unit 43 as determination means determines whether or not a process satisfies a certain condition. The calculation unit 44 calculates, for example, the position of the center of gravity of the detected region of the hand. The output unit 45 as output means outputs the information to the display 12. The recognition unit 46 as recognition means recognizes a gesture command. The control unit 47 as control means controls the operation of an application. The inference unit 48 as inference means infers a gesture command by analogy. The storage unit 49 stores the information that the obtainment unit 41 obtained from the input unit 27 in the storage unit 28.
Normal Mode The personal computer 1 that executes the present invention controls each application in a normal mode and a feedback mode. The normal mode is a mode in which an image of an application selected by a user is displayed. The feedback mode is a mode in which operation information regarding a gesture is fed back to the user.

Figure 5:
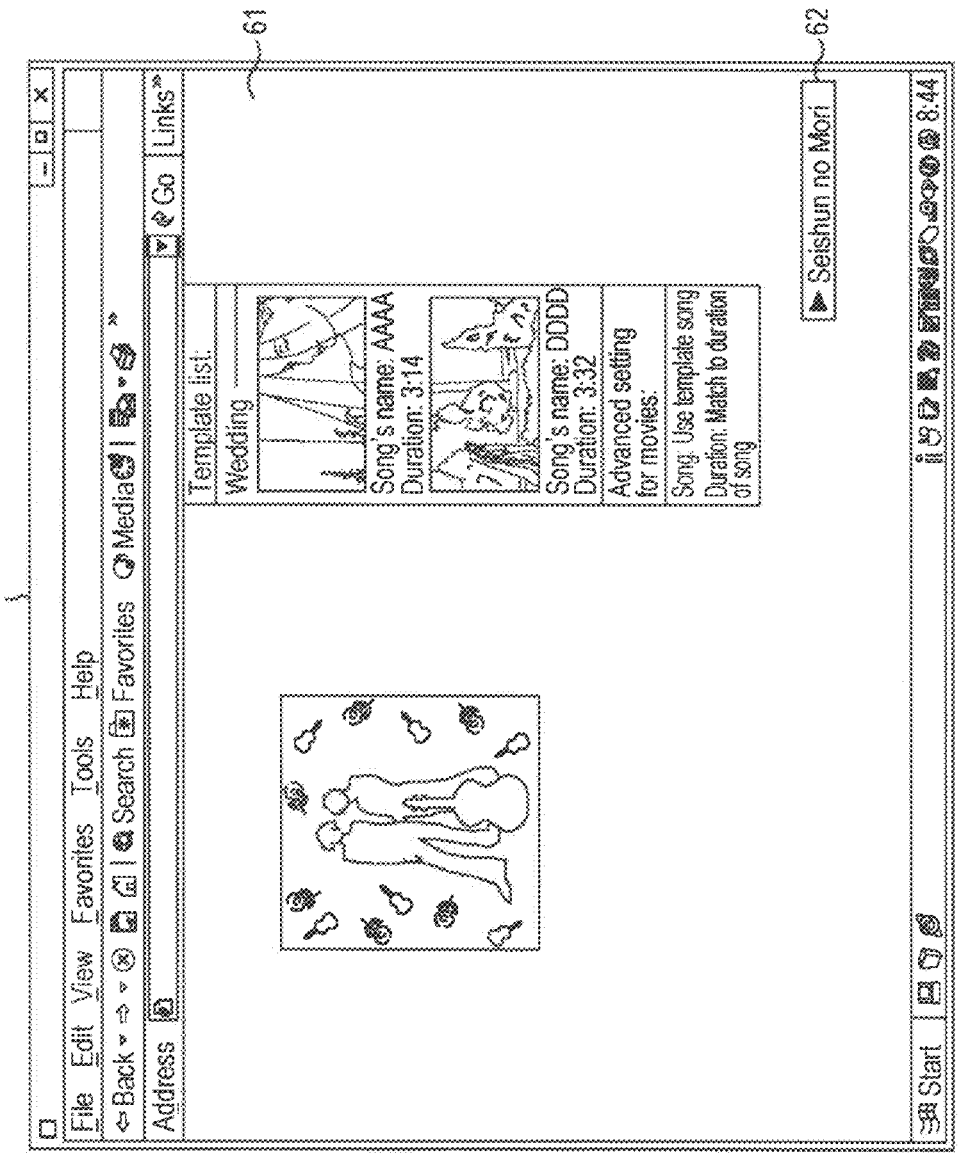
FIG. 5 is a diagram illustrating a display example in a normal mode.

FIG. 5 is a diagram illustrating a display example in the normal mode. As illustrated in FIG. 5, in the normal mode, an image 61 shown by a web browser (hereinafter simply referred to as web browser 61 as necessary) as a first application operating in the foreground is displayed on the display 12 by the output unit 45.

In the background, in contrast, a music player is operating as a second application. The operation of the first application is controlled on the basis of an operation in which the user directly touches the keyboard, the mouse, the touch panel, the touch pad, the pen device, or the like with his/her finger.

On the other hand, the operation of the second application is controlled on the basis of a gesture operation that is performed by the user who moves his/her hand in three-dimensional space.

In the example of FIG. 5, a title 62 of a song selected for the music player operating in the background is displayed in the web browser 61. It is to be noted that the title 62 might not be displayed.

Process for Inputting Gesture Command

Figure 6:
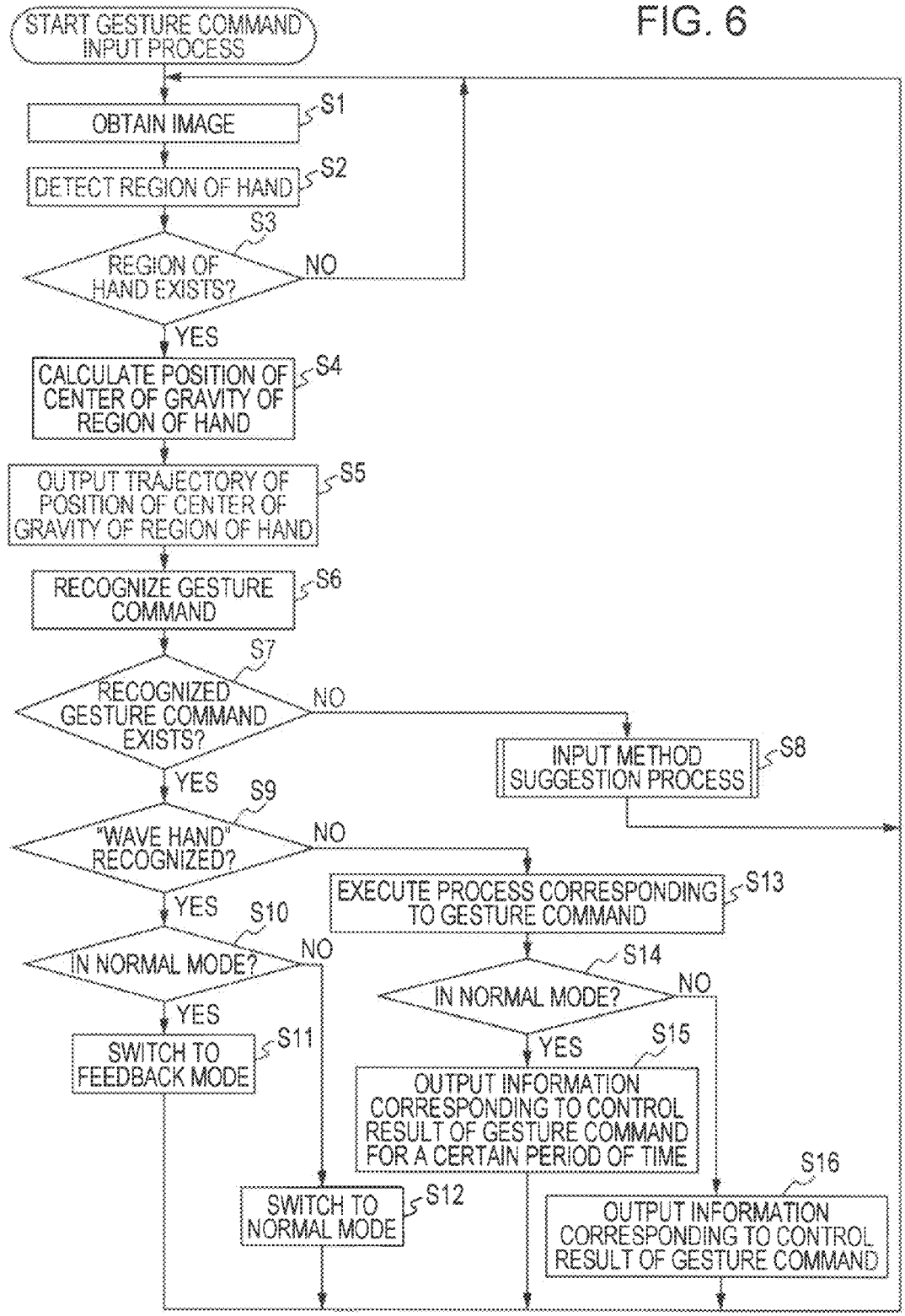
FIG. 6 is a flowchart describing a process for inputting a gesture command.

A process for inputting a gesture command when a gesture is input by the user in the normal mode, which has been illustrated in FIG. 5, is illustrated in FIG. 6.

FIG. 6 is a flowchart describing the process for inputting a gesture command, where a gesture obtained from the user is recognized and the type of gesture recognized is input as a gesture command.

As illustrated in FIG. 5, the process for inputting a gesture command is executed when, under a condition that a certain application (a web browser, for example) is operating in the foreground, another application (a music player, for example) is operating in the background.

In step S1, the obtainment unit 41 obtains an image captured by the camera 11. That is, the image is captured and a time stamp is obtained as time information at the time. The obtainment unit 41 obtains a plurality of images at the same time. The images to be obtained may be images that have been obtained by the camera 11, or may be edited images, which are, for example, grayscale images or the like.

In step S2, the detection unit 42 detects the region of a hand from the obtained images. As the region of the hand, for example, a region that changes in the plurality of images that have been obtained is detected. That is, since a background image is still, the difference in pixel values of the background portion between two images will be zero or sufficiently small. On the other hand, since the hand can move, the difference in pixel values of the hand portion between the two images may be a sufficiently large value. An area in which difference values are equal to or higher than a certain threshold value can be detected as the region of the hand.

In step S3, the determination unit 43 determines whether or not the region of the hand detected in step S2 exists. That is, a selected image and an image captured a certain period of time or more ago, which is, for example, 100 ms or more ago, are compared, so as to determine whether or not there is an area in which the dimensions of a region having the difference in the pixel values that is equal to or greater than the threshold value are within a standard range. Whether or not an image is one captured the certain period of time ago is determined on the basis of the time stamp.

If it is determined in step S3 that the region of the hand does not exist, that is, if the dimensions of the region in which the difference in the pixel values is equal to or greater than the threshold value are larger or smaller than the standard range, the process returns to step S1.

If it is determined in step S3 that the region of the hand exists, that is, if the dimensions of the region in which the difference in the pixel values is equal to or greater than the threshold value are within the standard range, the calculation unit 44 calculates the position of the center of gravity of the detected region of the hand in step S4.

If there are a plurality of regions of hands detected by the processing of step S2, the calculation unit 44 may select one of the regions and calculate the position of the center of gravity of the selected region, or may calculate the position of the center of gravity for each of the detected regions of the hands.

In step S5, the output unit 45 outputs the trajectory of the position of the center of gravity of the detected region of the hand on the display 12. An example in which the trajectory of the center of gravity of the region of the hand is displayed on the display 12 is illustrated in FIG. 7.

Figure 7:
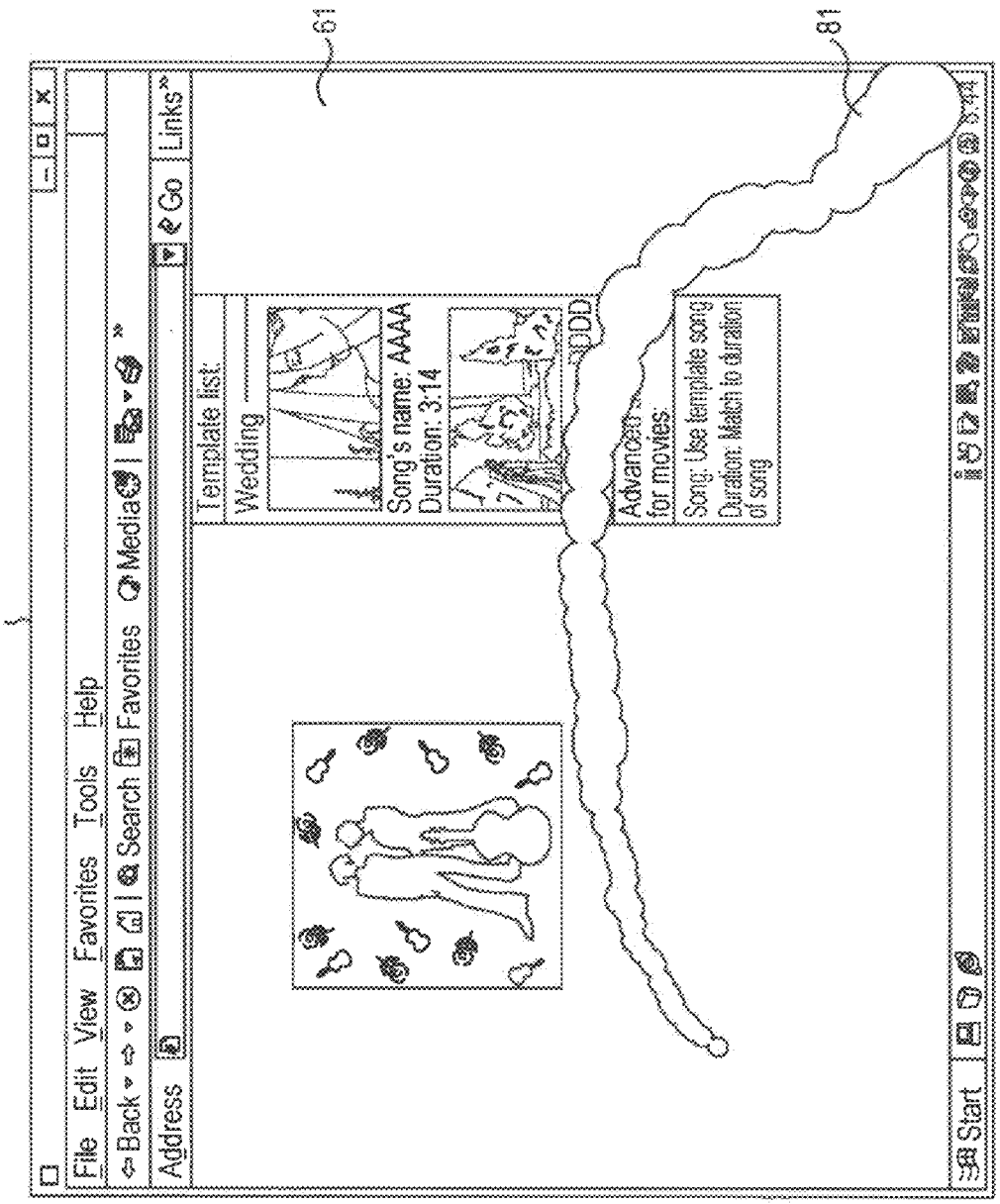
FIG. 7 is a diagram illustrating another display example in the normal mode.

FIG. 7 is a diagram illustrating an example in which the trajectory of the region of the user's hand is displayed in the normal mode. In the example of FIG. 7, a trajectory 81 of the region of the hand is displayed on the display 12.

The trajectory 81 illustrated in FIG. 7 is an example of the trajectory when a gesture command "left flick", which is a gesture in which the hand flicks from the right to the left of the screen, is input by the user.

In this example, the trajectory 81 is represented by a movement of a circle whose center is the position of the center of gravity calculated in step S4 illustrated in FIG. 6. The circle shown at each position along the movement is displayed for a certain period of time and disappears after a certain period of time has elapsed.

It is to be noted that the dimensions of the circle for the trajectory 81 may be changed to be larger or smaller in accordance with the elapse of time, the dimensions of the region of the hand, or the speed of movement of the region of the hand. For example, the dimensions of the circle may become larger as the time elapses and then become smaller after reaching certain values, with the circle disappearing after that.

The trajectory 81 can be represented not only by the circle but also by a single curve or anything else that represents the movement of the user's hand.

By displaying the trajectory 81 for the certain period of time, the user can check his/her gestures without significantly obstructing the operation with the web browser 61.

It is to be noted that the trajectory 81 may be displayed only in the feedback mode and may not be displayed in the normal mode. In this case, the trajectory 81 can be prevented from causing an image corresponding to an application operating in the foreground to be difficult to see.

Referring back to FIG. 6, after the processing for outputting the trajectory in step S5, the recognition unit 46 recognizes a gesture command on the basis of the trajectory of the position of the center of gravity of the region of the hand in step S6. That is, the type of gesture is recognized. An example of gesture commands to be recognized is illustrated in FIG. 8.

FIG. 8 is a control table illustrating relationships between gesture commands and corresponding operation content. The control table is stored in the storage unit 28 in advance. An example of the gesture commands and the corresponding operation content will be described.

As described with reference to FIG. 7, when "left flick" is input as a gesture command, the control unit 47 changes a song that is currently selected for the music player to a next song.

"Right flick" is a gesture in which the hand flicks from the left to the right of the screen. When "right flick" is input as a gesture command, the control unit 47 changes a song that is currently selected for the music player to a previous song.

"Hold up hand" is a gesture in which the hand is held in front of the camera 11 for a certain period of time. When "hold up hand" is input as a gesture command, the control unit 47 either stops a song that is currently playing back or plays back a song that has been stopped. Playback sound of a song is output from the speaker that forms the output unit 21 as output means.

"Draw double circle clockwise" is a gesture in which the hand draws a circle twice clockwise. When "draw double circle clockwise" is input as a gesture command, the control unit 47 registers a song that is currently selected by the music player as "favorite".

"Draw double circle counterclockwise" is a gesture in which the hand draws a circle twice counterclockwise. When "draw double circle counterclockwise" is input as a gesture command, the control unit 47 removes a song that is currently selected by the music player from "favorite".

"Wave hand" is a gesture in which the hand is moved to the left and right several times in front of the camera 11. When "wave hand" is input as a gesture command, the control unit 47 performs switching of the mode.

That is, when the current mode is the normal mode, switching to the feedback mode is performed, and when the current mode is the feedback mode, switching to the normal mode is performed. The feedback mode will be described later with reference to FIG. 10.

The operation "wave hand" is a gesture that the user naturally makes when a gesture has not been recognized, that is, when it is necessary to provide the user with feedback information. Therefore, by relating the gesture "wave hand" to the switching of the mode, the user can be provided with feedback information more easily.

Needless to say, for example, a gesture such as "open hands", where hands that have been held together are separated to the left and right like when a curtain is being opened by both hands can be related to switching of the mode.

"Move hand up and down" is a gesture in which the hand is moved up and down several times in front of the camera 11. When "move hand up and down" is input as a gesture command, the control unit 47 randomly selects a song that is registered in the music player.

When a gesture made by the user is recognized as described above, a gesture command is input and a process corresponding to the gesture command is executed. It is to be noted that the gesture commands and the processes corresponding to the gesture commands are not limited to the example illustrated in FIG. 8.

Referring back to FIG. 6, in step S7, the determination unit 43 determines whether or not a recognized gesture command exists. That is, it is determined whether or not the recognized gesture command matches a gesture command in the control table of FIG. 8.

If it is determined in step S7 that a recognized gesture command does not exist, that is, if it is determined that the recognized gesture command does not match a gesture command in the control table of FIG. 8, a process for suggesting an input method is executed in step S8. The details of the process for suggesting an input method are illustrated in FIG. 9.

Process for Suggesting Input Method

Figure 9:
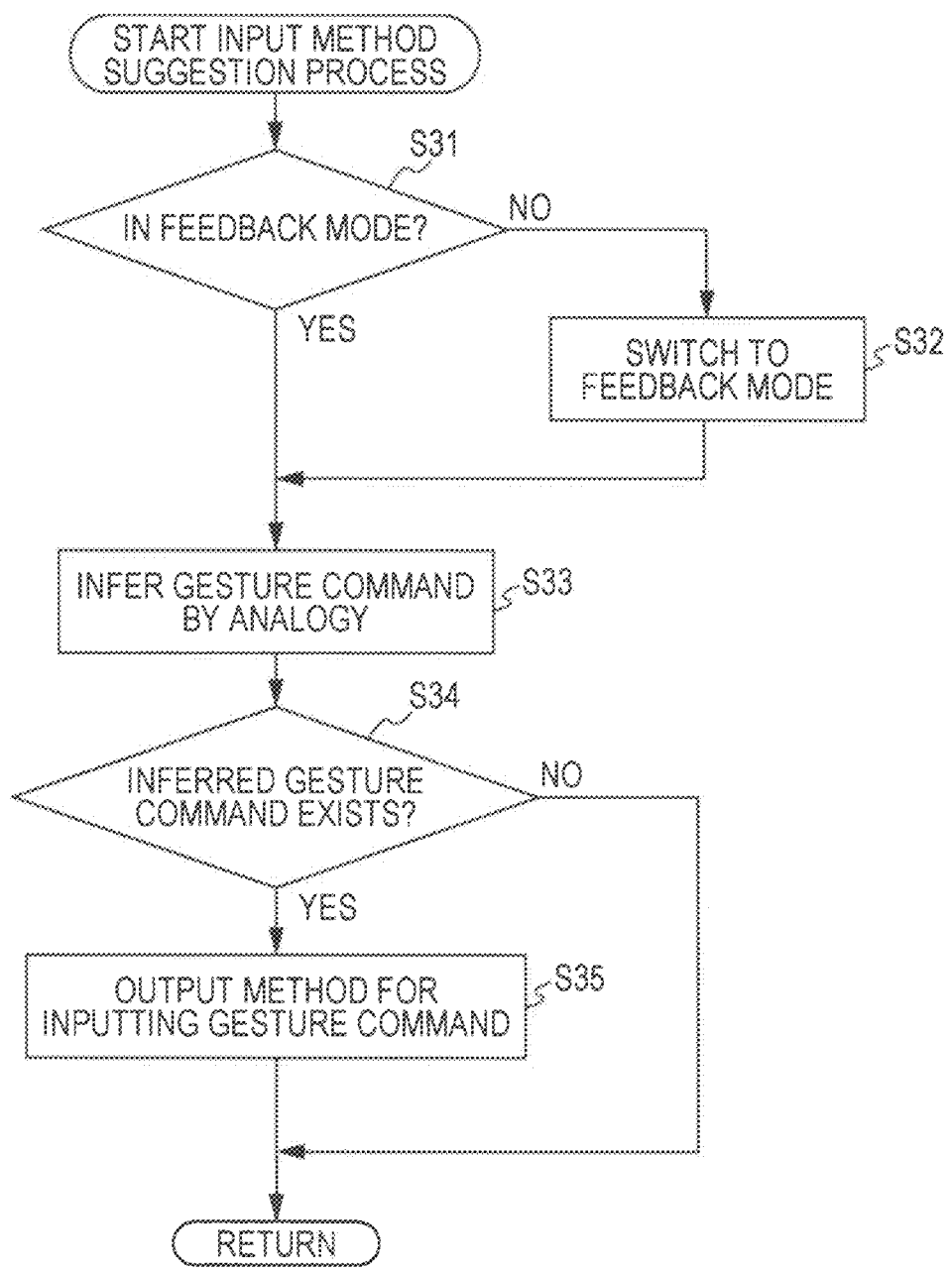
FIG. 9 is a flowchart describing a process for suggesting an input method.

FIG. 9 is a flowchart illustrating the details of the process for suggesting an input method in step S8 of FIG. 6. The process for suggesting an input method is a process for allowing the user to learn a method for inputting a gesture when a gesture input by the user has not been recognized.

In step S31, the determination unit 43 determines whether or not the current mode is the feedback mode. The details of the feedback mode are illustrated in FIG. 10.

Feedback Mode

Figure 10:
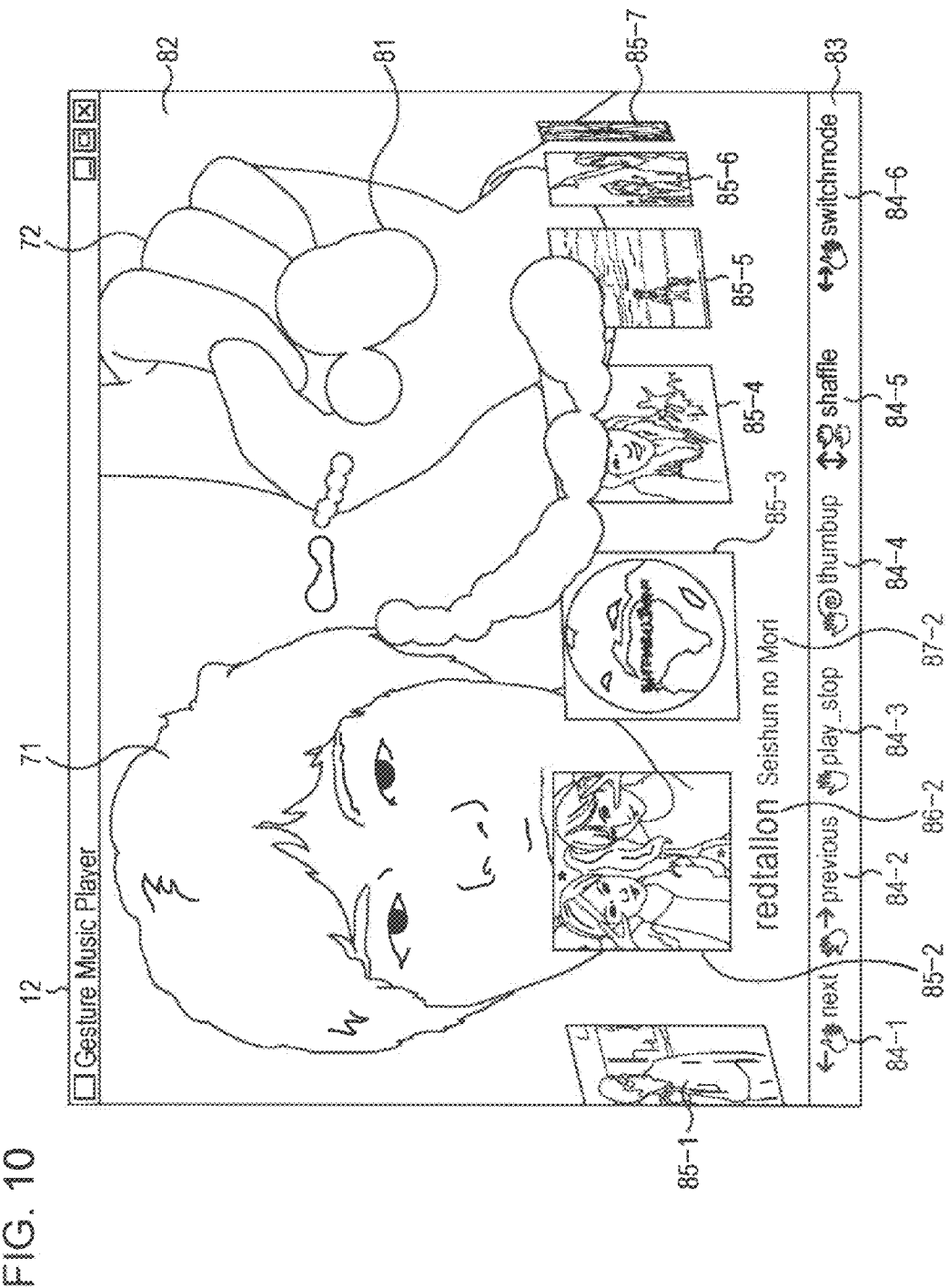
FIG. 10 is a diagram illustrating a display example in a feedback mode.

FIG. 10 is a diagram illustrating a display example in the feedback mode. In the feedback mode, at least a mirror image and a gesture command list are displayed as operation information regarding the gestures.

In the display example of the feedback mode of FIG. 10, the trajectory 81, a mirror image 82, a gesture command list 83, gesture commands 84 (more specifically, gesture commands 84-1 to 84-6), jacket pictures 85 (more specifically, jacket pictures 85-1 to 85-7), a singer's name 86-2, and a song's name 87-2 are displayed on the display 12.

In the feedback mode, the mirror image 82, which is an image of the user that has been captured by the camera 11 and subjected to image processing, is displayed in the background. A mirror image is an image in which left and right are reversed. That is, when the user moves his/her right hand, a left hand 72 moves in the image of a user 71 displayed in the mirror image 82. When the left hand of the user moves, the right hand moves in the mirror image 82.

By displaying the mirror image 82 as described above, the movement of the user who is inputting a gesture by hand corresponds to the movement of the hand 72 of the user 71 displayed on the display 12, thereby allowing the user to easily check the operation by the gesture.

It is also possible to display the region of a hand, a body, a face, or the like with which movement has been detected instead of the mirror image 82, or display an image obtained by further performing another type of image processing on the mirror image 82.

The image obtained by performing another type of image processing on the mirror image 82 may be, for example, an image in which the color of the image has been changed to monochrome, sepia, or the like, an image in which a part of a face or a body has been recognized and changed to an avatar corresponding to the part, a pencil sketch, a painting-like image, or the like.

By performing the image processing, a user who would feel uncomfortable with his/her face being directly displayed can perform an operation comfortably.

A list of gestures that the user can input, that is, the gesture commands 84-1 to 84-6, is displayed on the gesture command list 83.

At the gesture commands 84-1 to 84-6, a simple input method for each gesture, that is, the way to move the hand, and the operation content are indicated.

An image of the gesture command 84-1 illustrates the gesture command "left flick" in the control table of FIG. 8. "Next", which corresponds to the gesture command 84-1, represents the operation content "change to next song".

An image of the gesture command 84-2 illustrates the gesture command "right flick" in the control table. "Previous", which corresponds to the gesture command 84-2, represents the operation content "change to previous song".

An image of the gesture command 84-3 illustrates the gesture command "hold up hand" in the control table. "Play_stop", which corresponds to the gesture command 84-3, represents the operation content "switching between playback and stop".

An image of the gesture command 84-4 illustrates the gesture command "draw double circle clockwise" in the control table. "Thumbup", which corresponds to the gesture command 84-4 represents the operation content "registration to favorite".

An image of the gesture command 84-5 illustrates the gesture command "move hand up and down" in the control table. "Shuffle", which corresponds to the gesture command 84-5, represents the operation content "random selection of song".

An image of the gesture command 84-6 illustrates the gesture command "wave hand" in the control table. "Switch-mode", which corresponds to the gesture command 84-6, represents the operation content "switching of mode".

Since the gesture commands 84 that simply indicate the gestures and the operation corresponding to the gestures are displayed on the gesture command list 83 as described above, the user can easily check the type of gesture and the corresponding operation content.

As an image for each of the jacket pictures 85, a jacket image corresponding to each song stored in the music player is displayed.

Among the jacket pictures 85-1 to 85-7, the jacket picture 85-2 illustrates a jacket of a song that is currently selected. An image for the jacket picture 85-2 that is currently selected is, for example, made to bounce up and down or displayed bigger than jackets that are not selected, so as to make it clear that the jacket picture 85-2 is selected.

An indication "redtallon" as the singer's name 86-2 is the singer's name of a song of the jacket picture 85-2 that is currently selected. The song's name 87-2 "Seishun no Mori" that is currently selected is the name of the song of the jacket picture 85-2.

By displaying the feedback mode as described above, the user can check the input operation of gestures, the cause of a gesture not being recognized, the type and the operation content of a gesture, and the operation of a corresponding application such as a music player.

Referring back to FIG. 9, if it is determined in step S31 that the current mode is not the feedback mode, that is, if it is determined that the current mode is the normal mode, the control unit 47 switches the normal mode to the feedback mode in step S32.

If it is determined in step S31 that the current mode is the feedback mode, or after the processing of step S32 is executed, the process proceeds to step S33.

In step S33, the inference unit 48 infers a gesture command by analogy on the basis of the trajectory of the position of the center of gravity of the region of the hand calculated by the processing of step S4 of FIG. 6.

That is, processing similar to the processing for recognizing a gesture command in step S6 of FIG. 6 is executed, and, furthermore, how likely a gesture is a certain gesture command (likelihood) is calculated and evaluated in order to infer the gesture command by analogy.

For example, when the user makes a gesture of drawing a circle, the inference unit 48 calculates the likelihood that the gesture is a circle.

The inference unit 48 then, as an evaluation process, determines whether or not the likelihood is equal to or higher than a threshold value, namely, for example, 60% or more. If the likelihood calculated for the circle drawn by the user is, for example, 80%, the inference unit 48 infers the gesture made by the user to be a circle by analogy.

In step S34, the determination unit 43 determines whether or not the inferred gesture command exists. That is, the likelihood calculated for the gesture is equal to or higher than the certain threshold value.

If it is determined in step S34 that the inferred gesture command exists, that is, if it is determined that the likelihood calculated for the gesture is equal to or higher than the certain threshold value, the output unit 45 outputs the method for inputting the gesture command in step S35.

Figure 11:
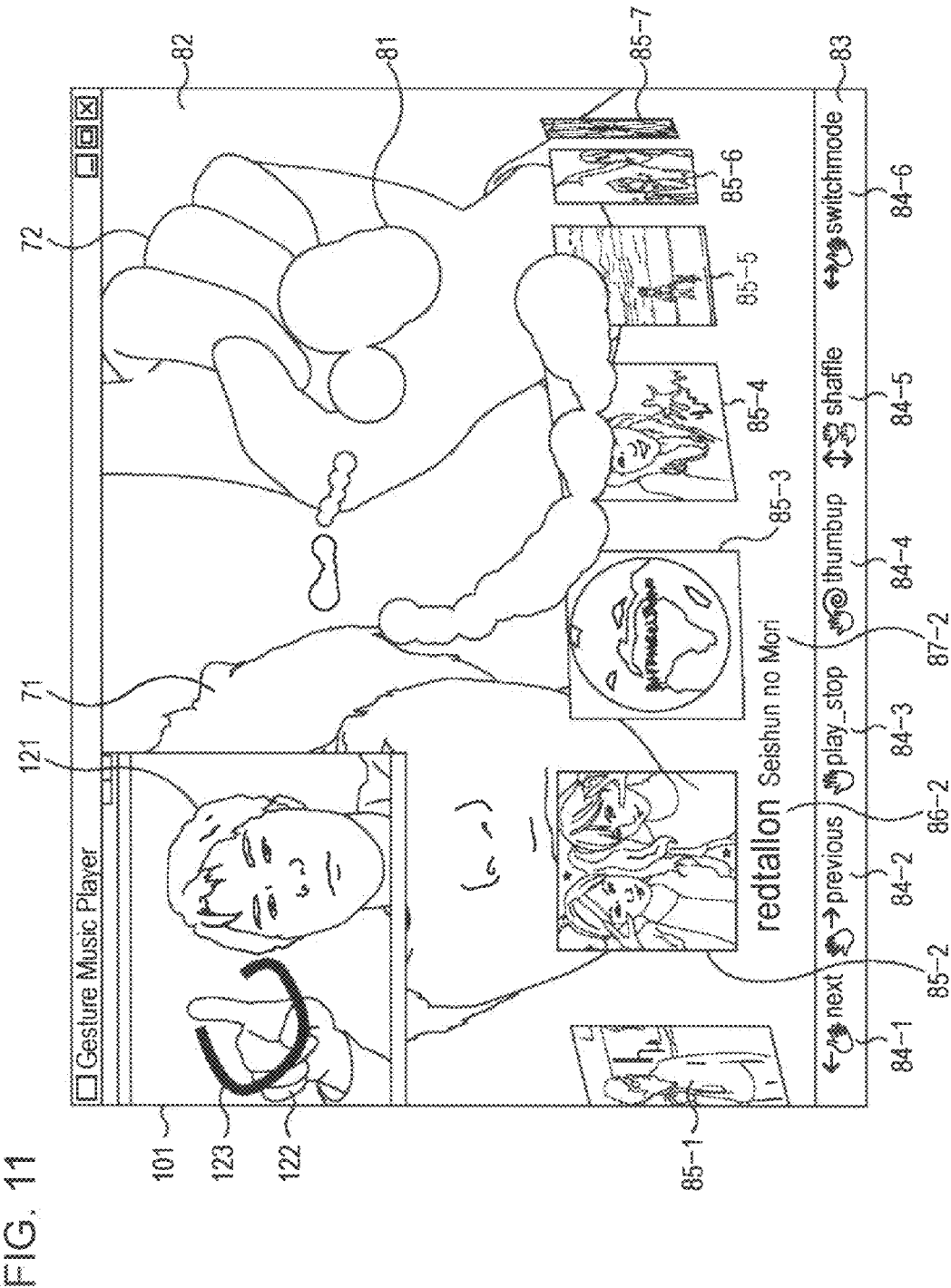
FIG. 11 is a diagram illustrating a display example of suggesting an input method.
Figure 12:
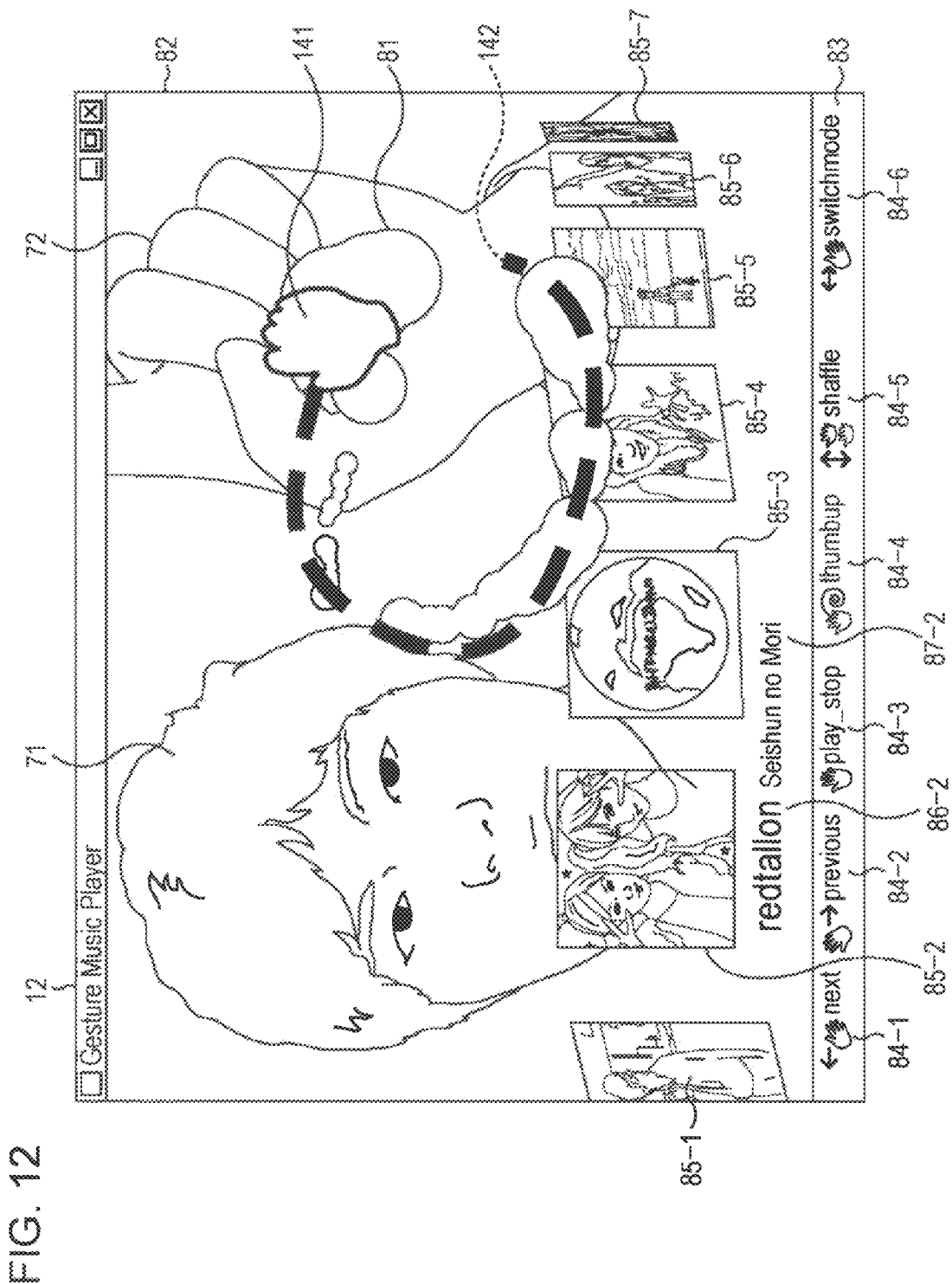
FIG. 12 is a diagram illustrating another display example of suggesting an input method.

Examples of outputting the method for inputting a gesture command as feedback information for learning a gesture are illustrated in FIGS. 11 and 12.

Suggestion of Method for Inputting Gesture Command

FIG. 11 illustrates an example of outputting the method for inputting a gesture command using a moving image in the feedback mode. FIG. 12 illustrates an example of outputting the method for inputting a gesture command using an animation in the feedback mode.

The user presets whether either a moving image (FIG. 11) or an animation (FIG. 12) is to be output as an output for the method for inputting a gesture command. The storage unit 49 stores the set input method in the storage unit 28.

When the processing of step S35 is executed, the input method set by the user is read out from the storage unit 28.

In FIG. 11, an input method suggestion window 101 is displayed on the upper left of the mirror image 82. It is to be noted that the display position of the input method suggestion window 101 is not limited to the upper left so long as the display position is within the display area of the feedback mode.

In the input method suggestion window 101, an instructor 121 of a gesture, a hand 122 of the instructor, and a gesture instruction line 123 for learning a gesture are displayed.

The gesture instruction line 123 represents an input method for learning a gesture of drawing a circle. The method for inputting a gesture is suggested to the user by playing back a moving image in which the instructor 121 moves his/her hand 122 in accordance with the gesture instruction line 123.

Since the operation by the user is displayed in the mirror image 82, the user can learn the method for inputting a gesture while checking the movement of the hand 72 and the trajectory 81 in the mirror image 82 and the moving image in the input method suggestion window 101 at the same time.

Moving images for learning, which are intended to suggest input methods, are stored in the storage unit 28 in advance and categorized in terms of the type of gesture. A moving image for learning to be output is determined on the basis of the gesture inferred by analogy in step S33 of FIG. 9 or the gesture that has been arbitrarily selected by the user.

It is to be noted that, in the input method suggestion window 101 of FIG. 11, a mirror image that is obtained by performing image processing on an image to be displayed may be displayed.

In FIG. 12, an animation 141 and a trajectory 142 of the animation 141 are displayed in the mirror image 82.

The trajectory 142 of the animation 141 represents an input method for learning a gesture of drawing a circle. The animation 141 moves along the trajectory 142 of the animation 141.

Since the animation 141 and the trajectory 142 of the animation 141 are displayed in the mirror image 82, the user can learn the method for inputting a gesture by moving his/her hand 72 in accordance with the animation 141. In FIG. 12, the trajectory 81 generated by the hand 72 that has been moved along the trajectory 142 of the animation 141 by the user is also displayed.

Animations for suggesting input methods are also stored in the storage unit 28 in advance and categorized in terms of the type of gesture as in the case with the moving images for learning. An animation to be output is determined on the basis of the gesture inferred by analogy in step S33 of FIG. 9 or the gesture that has been arbitrarily selected by the user.

Referring back to FIG. 9, if it is determined in step S34 that the inferred gesture command does not exist, that is, if it is determined that the likelihood calculated for the gesture is lower than the certain threshold value, or after the processing of step S35, the process for suggesting an input method terminates and the process returns to step S1 of FIG. 6.

Because of the process for suggesting an input method that has been described above, when an input by a gesture has failed, that is, when a desired operation is not executed even when a gesture has been input, the user can check the reason why the gesture has not been recognized, as well as learning a correct method for inputting a gesture command as a solution.

In the above description, when a gesture command has not been recognized in the normal mode, switching to the feedback mode is automatically performed (step S32) and processing for inferring a gesture command by analogy is executed (step S33). Alternatively, switching to the feedback mode may be automatically performed (step S32) only when a gesture command has been inferred by analogy after inference of the gesture command has been performed (when the processing of step S34 is determined to be "YES").

Referring back to FIG. 6, if it is determined in step S7 that the recognized gesture command exists, that is, if it is determined that the recognized gesture command matches any of the gesture commands described in the control table of FIG. 8, the determination unit 43 determines whether or not the gesture command is recognized as "wave hand" in step S9.

If the gesture command is recognized as "wave hand" in step S9, that is, when switching of the mode is instructed by the user, the determination unit 43 determines whether or not the current mode is the normal mode in step S10.

If it is determined in step S10 that the current mode is the normal mode, the control unit 47 switches the mode to the feedback mode in step S11.

If it is determined in step S10 that the current mode is not the normal mode, that is, if it is determined that the current mode is the feedback mode, the control unit 47 switches the mode to the normal mode in step S12.

It is to be noted that the switching from the feedback mode to the normal mode may be performed automatically when the gesture has been correctly recognized.

On the other hand, if the gesture command is not recognized as "wave hand" in step S9, that is, when a process other than mode switching is instructed by the user, the control unit 47 executes a process corresponding to the gesture command in step S13.

"A process corresponding to the gesture command" refers to a process for executing the operation content described in the control table of FIG. 8. For example, when playback is instructed, a song is output from the speaker as the output unit 21, but description of specific examples is omitted since the specific examples have been described above with reference to FIG. 8.

In step S14, the determination unit 43 determines whether or not the current mode is the normal mode.

If it is determined in step S14 that the current mode is the normal mode, the output unit 45 outputs information corresponding to the control result of the gesture command on the display 12 for a certain period of time. An example of display content corresponding to the gesture commands is illustrated in FIG. 13.

FIG. 13 is a diagram illustrating a display table that represents relationships between the gesture commands and the display content corresponding to the gesture commands. It is to be noted that the control table of FIG. 8 and the display table of FIG. 13 may be managed together as a single table.

When "left flick" is input as a gesture command, the output unit 45 moves a song list to the left by one jacket picture. A display example of the normal mode when "left flick" has been input is illustrated in FIG. 14.

Figure 14:
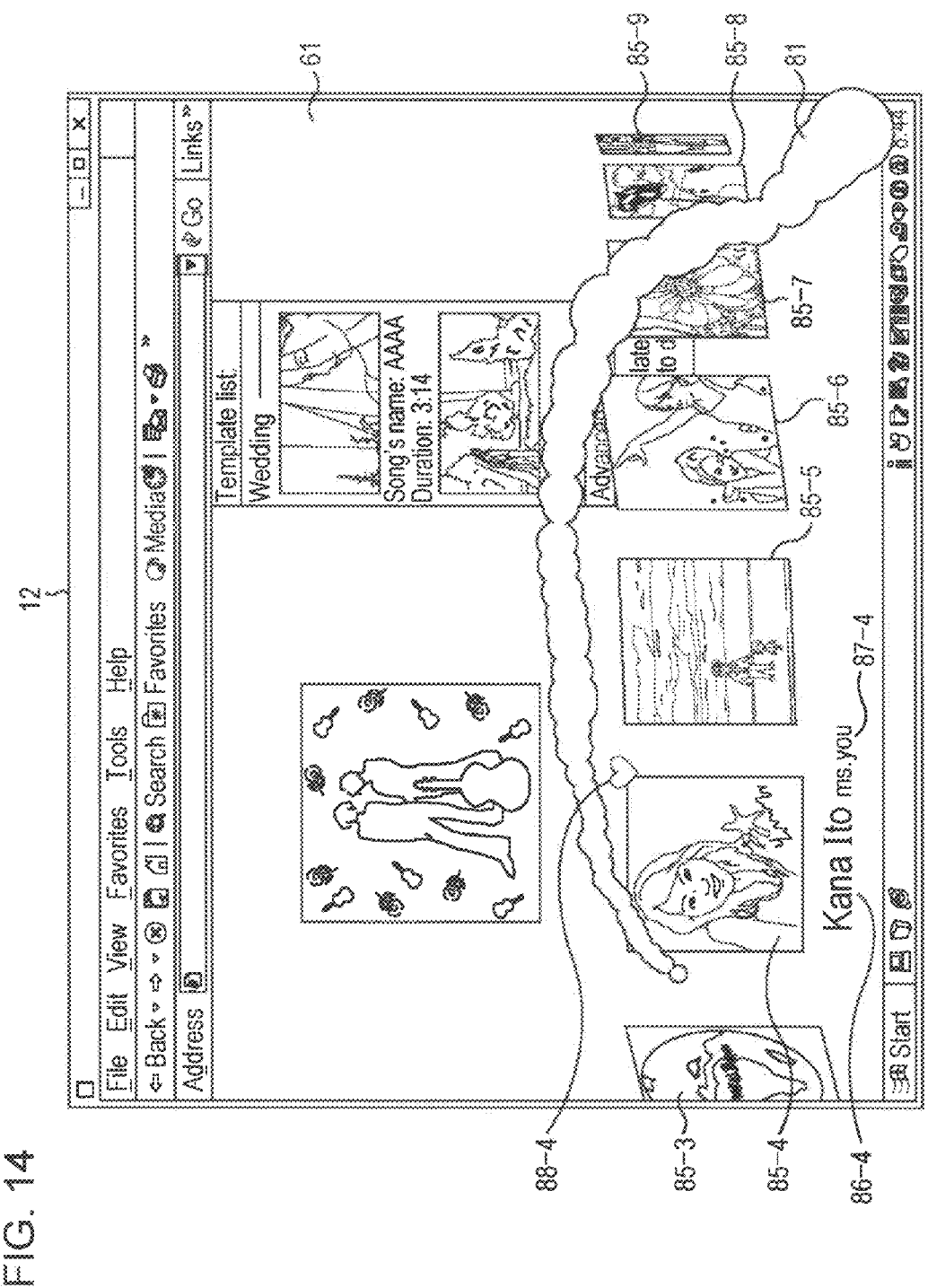
FIG. 14 is a diagram illustrating another display example in the normal mode.

FIG. 14 is a diagram illustrating a display example when "left flick" has been input as a gesture command in the normal mode. FIG. 14 illustrates a state in which "left flick" has been performed twice from a condition illustrated in FIG. 10, that is, a state in which the song of the jacket picture 85-2 was selected.

That is, the example of FIG. 14 illustrates a condition in which each of the jacket pictures 85-1 to 85-7 illustrated in FIG. 10 has moved to the left by two jacket pictures and the song of the jacket picture 85-4 is selected.

In addition, with "left flick" performed twice, the jacket pictures 85-1 and 85-2 that have been displayed on the left of the screen are no longer displayed, and jacket pictures 85-8 and 85-9 are newly displayed on the right of the screen.

Referring back to FIG. 13, when "right flick" is input as a gesture command, the output unit 45 moves the song list to the right by one jacket picture.

That is, when "right flick" is input in the condition of FIG. 14, an image in which each of the jacket pictures 85-3 to 85-9 has been moved to the right by one jacket picture is output. In addition, the jacket picture 85-9 is no longer displayed, and the jacket picture 85-2 illustrated in FIG. 10 is displayed in the position of the jacket picture 85-3 in FIG. 14.

When "hold up hand" is input as a gesture command, the output unit 45 displays an icon of playback or stop within a screen area of the display 12.

When "draw double circle clockwise" is input as a gesture command, the output unit 45 displays an icon indicating "favorite" on the jacket pictures 85. A favorite mark 88-4 displayed on the upper right of the jacket picture 85-4 in FIG. 14 is the icon indicating "favorite".

When "draw double circle counterclockwise" is input as a gesture command, the output unit 45 removes the display of an icon indicating "favorite" from the jacket pictures 85. That is, the display of the favorite mark 88-4 in FIG. 14 is deleted.

When "move hand up and down" is input as a gesture command, a jacket picture 85-21, a singer's name 86-21, and a song's name 87-21 (none of these are illustrated) that have been randomly selected are displayed at the positions of the jacket picture 85-4, a singer's name 86-4, and a song's name 87-4 in FIG. 14, respectively.

Furthermore, jacket pictures 85-20 and 85-22 to 85-26 (not illustrated) that precede or follow the jacket picture 85-21 are displayed instead of the jacket pictures 85-3 and 85-5 to 85-9 in FIG. 14.

When a process corresponding to a gesture command is executed as described above, information corresponding to the gesture command is displayed in the web browser 61. It is to be noted that the gesture commands and the display content corresponding to the gesture commands are not limited to the example of FIG. 13.

In addition, as processing of step S15 of FIG. 6, the output unit 45 may output audio information such as voice or effect sound. When the gesture command "left flick" is input, for example, the output unit 45 plays back a voice of the name of the operation such as "next song" or "next" or a name of the gesture command, or the like, or an effect sound such as wind noise or a mingling sound as the audio information.

In the processing of step S15, the output unit 45 may output either a display image or audio information corresponding to the display content on the display table of FIG. 13, or may output both the display image and the audio information.

It is to be noted that a display image is deleted after a certain period of time in the normal mode. In doing so, the display image can be restrained from causing significant obstruction to an operation performed by the user with the web browser 61. For example, an icon corresponding to a gesture command may be displayed on a part of the display area of the image of the web browser 61, or the display image may be displayed on the image of the web browser 61 in a semitransparent manner.

If it is determined in step S14 that the current mode is not the normal mode, that is, if it is determined that the current mode is the feedback mode, the output unit 45 outputs information corresponding to the control result of the gesture command in step S16.

The information output in the processing of step S16 is the same as that output in the processing of step S15.

After the processing of steps S11, S12, S15, and S16, the process returns to step S1 and the same process is repeated.

Thus, the user can operate an application operating in the background on the basis of gestures while seeing an application operating in the foreground. In addition, the user can check the result of an operation performed on an application operating in the background on the basis of a gesture without obstructing the operation of the application operating in the foreground.

Other Display Examples in Normal Mode

Figure 15:
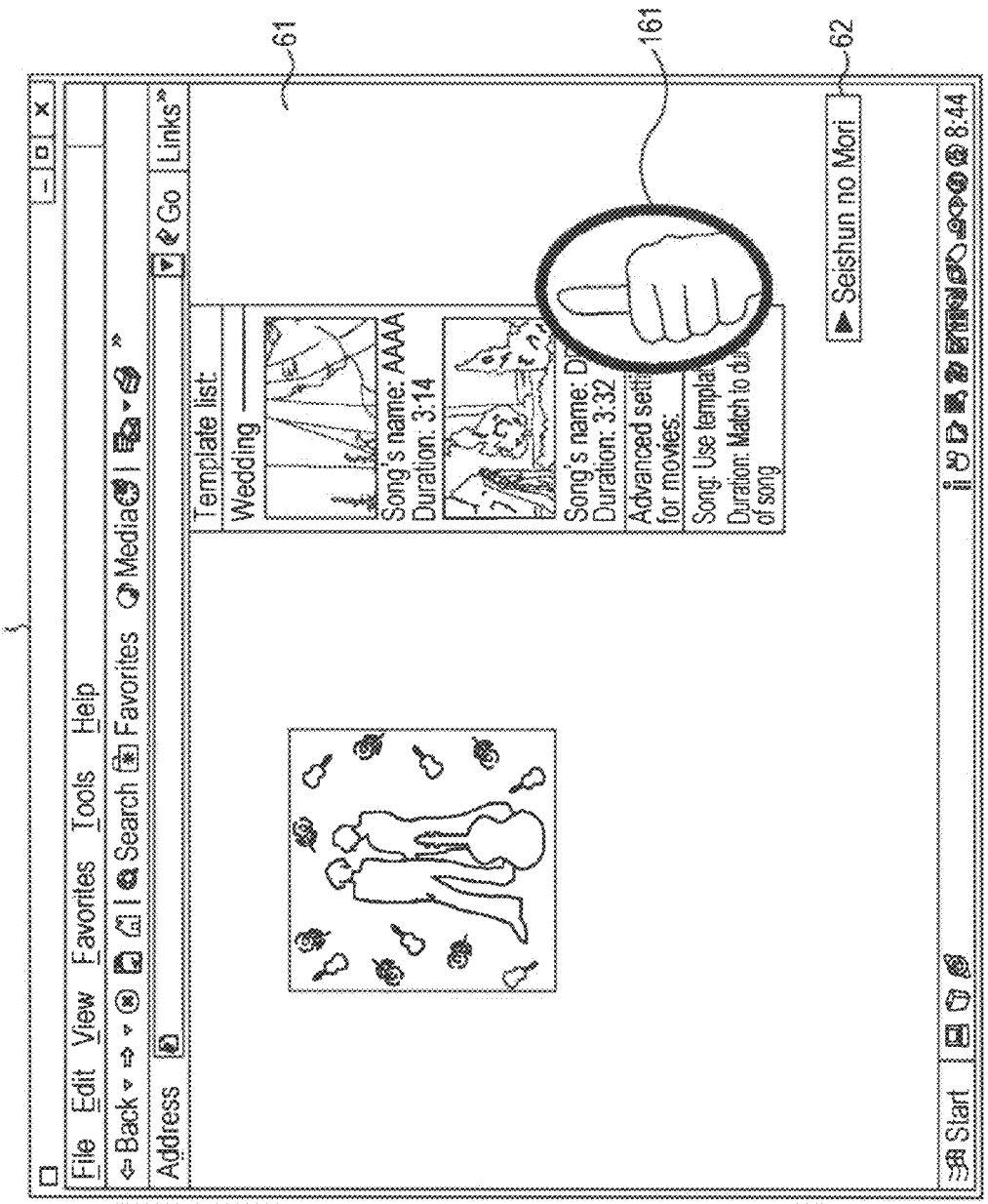
FIG. 15 is a diagram illustrating another display example in the normal mode.

FIG. 15 is a diagram illustrating another display example in the normal mode. FIG. 15 illustrates an example in which the operation of an application operating in the background is controlled by recognizing the shape of a hand as a gesture. A proximity region 161 of the hand in FIG. 15 is displayed instead of the trajectory 81 illustrated in FIG. 7.

That is, this process is executed by calculating the shape of a hand in step S4 of FIG. 6 instead of calculating the position of the center of gravity of the region of a hand, and by outputting the proximity region 161 of the hand with the output unit 45 in step S5 instead of outputting the trajectory 81 of the position of the center of gravity of the region of the hand.

The shape of the user's hand may be, for example, a closed hand, an open hand, or a thumb up shape (raising a thumb). The operation of an application operating in the background can be controlled by recognizing these gestures.

Other Display Examples in Feedback Mode

Figure 16:
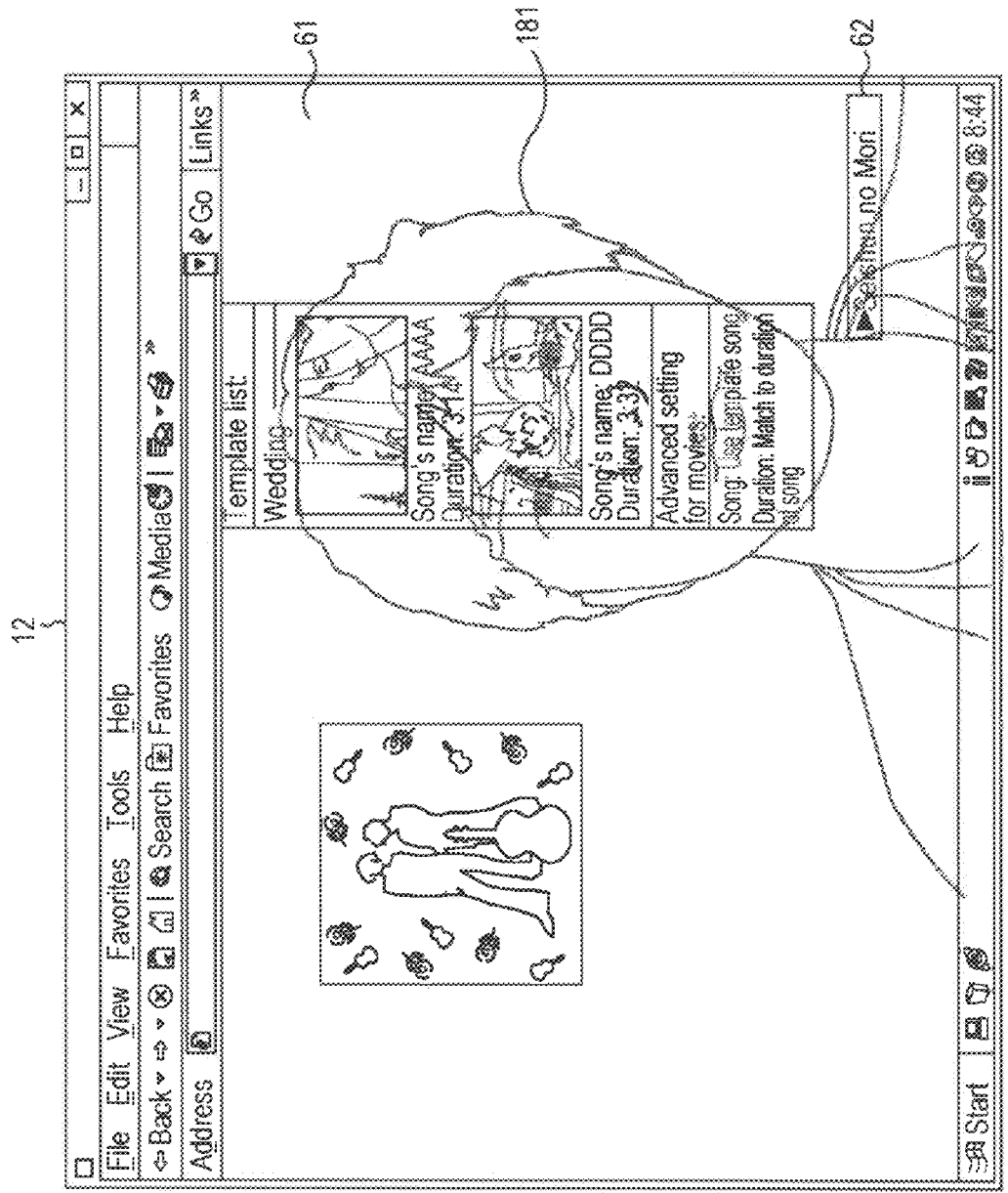
FIG. 16 is a diagram illustrating another display example in the feedback mode.
Figure 17:
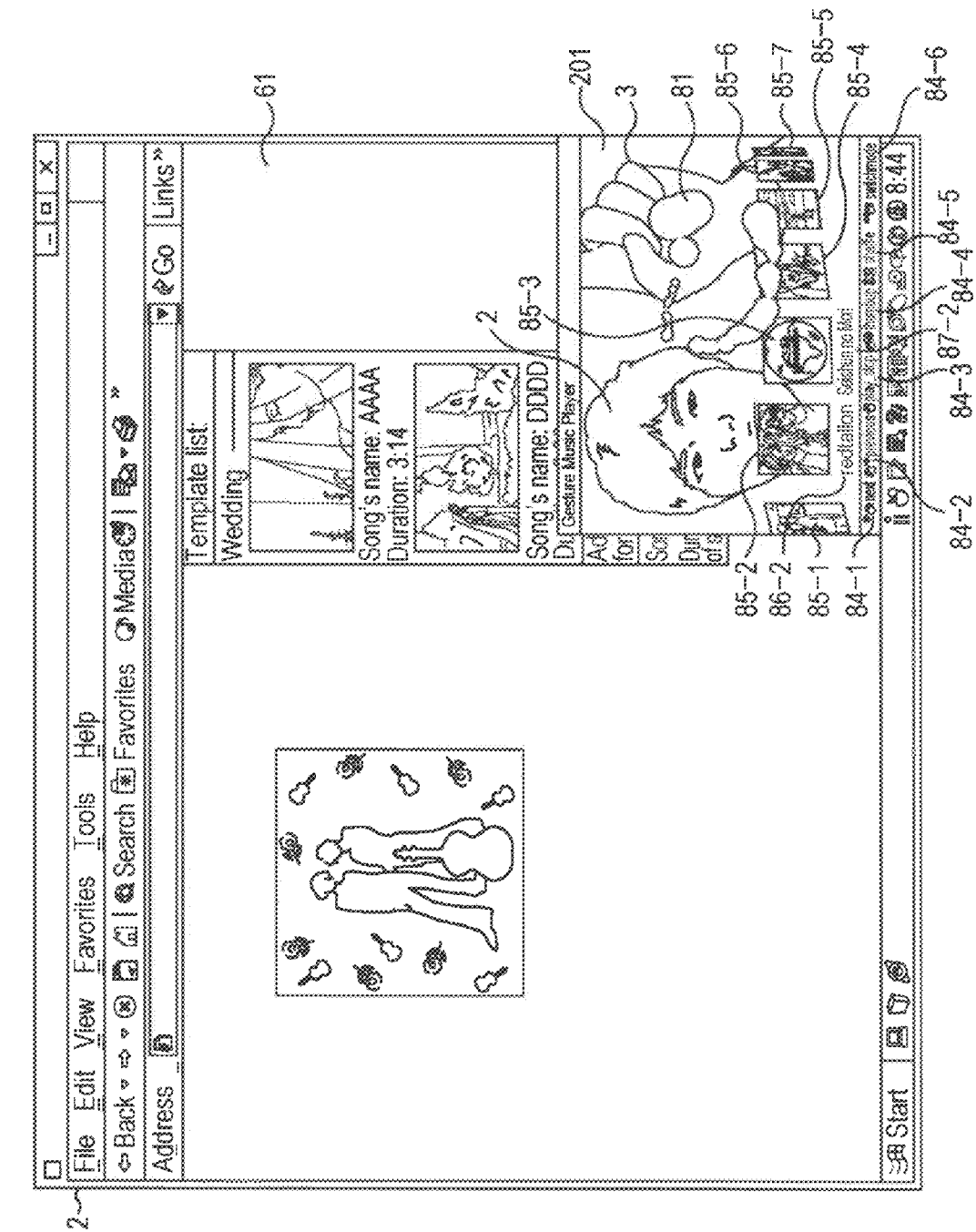
FIG. 17 is a diagram illustrating another display example in the feedback mode.

FIGS. 16 and 17 are diagrams illustrating other display examples in the feedback mode.

FIG. 16 is a diagram illustrating an example in which an image of the feedback mode is superimposed on the image of the normal mode (FIG. 5) in a semitransparent manner and output. In the example of FIG. 16, only a semitransparent mirror image 181 is displayed as the image of the feedback mode for simplicity.

By displaying a semitransparent image of the feedback mode superimposed on an image of the normal mode as described above, the user can feed back the operation of a gesture while displaying an application such as the web browser 61.

FIG. 17 is a diagram illustrating an example in which the image of the feedback mode (FIG. 10) is output in a region that is part of the image of the normal mode (FIG. 5). In the example of FIG. 17, a feedback window 201 is output in a lower right region of the display area of the web browser 61.

The display in the feedback window 201 is the same as that in the image of the feedback mode illustrated in FIG. 10.

It is to be noted that although the trajectory 81 is output both in the normal mode and the feedback mode, the trajectory 81 may be displayed on only either of the images of the modes when the image of the feedback mode is output in a region that is part of the image of the normal mode as in the example of FIG. 17. In the example of FIG. 17, the trajectory 81 is displayed only on the image of the feedback mode.

It is to be noted that the first application and the second application are not limited to a web browser and a music player, respectively.

In the above embodiment, since a music player is operating in the background, the music player is operated on the basis of the gesture commands. However, when a web browser is operating in the background, the web browser is operated on the basis of the gesture commands.

Needless to say, only a particular application (for example, a music player) operating in the background may be operated on the basis of the gesture commands.

The present application contains subject matter related to that disclosed in Japanese Priority Patent Application JP 2010-050630 filed in the Japan Patent Office on Mar. 8, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
   a personal computer connected to a camera separate from the personal computer, the personal computer having:
   processing circuitry configured to:
      detect a gesture made by a user based on an image of a predetermined portion of the user obtained by the camera;
      output for a predetermined period of time, while in a normal mode, a moving image representative of the user's actual movement regarding the gesture made by the user;
      recognize, in response to output of the moving image representative of the user's actual movement regarding the gesture made by the user, a gesture command from the detected gesture;
      determine whether the recognized gesture command has associated therewith a previously stored gesture command among a plurality of previously stored gesture commands by comparing the recognized gesture command to each of the plurality of previously stored gesture commands; and
      control operation of a first application and a second application,
   wherein the circuitry is further configured to output information associated with one or more of the first application and the second application,
   when the recognized gesture command is determined, by the circuitry based on the comparison of the recognized gesture command to each of the plurality of previously stored gesture commands, to have associated therewith a previously stored gesture command while the circuitry controls operation of the first application in a foreground, the circuitry controls operation of the second application operating in a background based on a control operation corresponding to the previously stored gesture command, except when the previously stored gesture command is a gesture command to switch modes, in which case the circuitry switches to a feedback mode if currently in the normal mode and switches to the normal mode if currently in the feedback mode,
   when the recognized gesture command is determined, by the circuitry based on the comparison of the recognized gesture command to each of the plurality of previously stored gesture commands, not to have associated therewith a previously stored gesture command while the circuitry controls operation of the first application in the foreground, operation information is fed back to the user, when the recognized gesture command is determined, by the circuitry based on the comparison of the recognized gesture command to each of the plurality of previously stored gesture commands, to be the gesture command to switch modes and the current mode is the normal mode, the circuitry switches to the feedback mode and the operation information is fed back to the user, the operation information fed back to the user is fed back simultaneously while the circuitry is outputting information associated with the one or more of the first application and the second application and includes:

a list of possible gestures associated with the previously stored gesture commands based on the gesture or another gesture made by the user, a moving image representative of the user's actual movement regarding the gesture or another gesture made by the user, and a predetermined moving image for learning a gesture command corresponding to one of the plurality of previously stored gesture commands, and the gesture command to switch modes is the same gesture command to switch from the feedback mode to the normal mode and to switch from the normal mode to the feedback mode.

2. The information processing apparatus according to claim 1, wherein the processing circuitry is further configured to:

infer the previously stored gesture command among the plurality of previously stored gesture commands by analogy when it is determined by the circuitry that the recognized gesture command does not have associated therewith the previously stored gesture command.

3. The information processing apparatus according to claim 1, wherein the moving image representative of the user's actual movement regarding the gesture made by the user is output by the circuitry on a screen as a mirror image of the user.

4. The information processing apparatus according to claim 1, wherein, in the normal mode, when operation of the second application is controlled based on the recognized gesture command, the circuitry is further configured to output information corresponding to a control result based on the recognized gesture command for the predetermined period of time.

5. The information processing apparatus according to claim 4, wherein the circuitry is further configured to cause output of audio information as the information corresponding to the control result based on the recognized gesture command.

6. The information processing apparatus according to claim 1, wherein switching to the feedback mode includes the circuitry causing display of an image of the feedback mode semi-transparently superimposed on an image of the first application.

7. The information processing apparatus according to claim 1, wherein switching to the feedback mode includes the circuitry causing display of an image of the feedback mode in a region that is part of an image of the first application.

8. The information processing apparatus according to claim 1, wherein the detection of the gesture by the user includes detection of a predetermined portion of a hand of the user and calculation of a center of gravity of the portion of the hand.

9. The information processing apparatus according to claim 1, wherein the detected gesture includes movement of the user's hand.

10. An information processing method implemented using a personal computer connected to a camera separate from the personal computer, the information processing method comprising:

detecting, using processing circuitry of the personal computer, a gesture made by a user based on an image of a predetermined portion of the user obtained by the camera;

outputting for a predetermined period of time, using the processing circuitry, while in a normal mode, a moving image representative of the user's actual movement regarding the gesture made by the user;

recognizing, using the processing circuitry, in response to output of the moving image representative of the user's actual movement regarding the gesture made by the user, a gesture command from the detected gesture;

determining, using the processing circuitry, whether or not the recognized gesture command has associated therewith a previously stored gesture command among a plurality of previously stored gesture commands by comparing the recognized gesture command to each of the plurality of previously stored gesture commands;

controlling, using the processing circuitry, operation of a first application and a second application; and outputting information, using the processing circuitry, associated with one or more of the first application and the second application, wherein, when the recognized gesture command is determined, based on the comparing the recognized gesture command to each of the plurality of previously stored gesture commands, to have associated therewith a previously stored gesture command while operation of the first application is controlled in a foreground, controlling operation of the second application operating in a background based on a control operation corresponding to the previously stored gesture command, except when the previously stored gesture command is a gesture command to switch modes, in which case a current mode is switched to a feedback mode if the current mode is the normal mode and is switched to the normal mode if the current mode is the feedback mode, when the recognized gesture command is determined, based on the comparing the recognized gesture command to each of the plurality of previously stored gesture commands, not to have associated therewith a previously stored gesture command while operation of the first application is controlled in the foreground, feeding back operation information to the user, when the recognized gesture command is determined, based on the comparison of the recognized gesture command to each of the plurality of previously stored gesture commands, to be the gesture command to switch modes and the current mode is the normal mode, the current mode is switched to the feedback mode and the operation information is fed back to the user, the operation information fed back to the user is fed back simultaneously while the circuitry is outputting information associated with the one or more of the first application and the second application and includes:

a list of possible gestures associated with the previously stored gesture commands based on the gesture or another gesture made by the user, a moving image representative of the user's actual movement regarding the gesture or another gesture made by the user, and a predetermined moving image for learning a gesture command corresponding to one of the plurality of previously stored gesture commands, and the gesture command to switch modes is the same gesture command to switch from the feedback mode to the normal mode and to switch from the normal mode to the feedback mode.

11. The information processing method according to claim 10, wherein said detecting the gesture made by the user includes detection of a predetermined portion of a hand of the user and calculation of a center of gravity of the portion of the hand.

12. The information processing method according to claim 10, wherein the detected gesture includes movement of the user's hand.

13. A non-transitory computer-readable storage medium storing computer-readable instructions thereon that when executed by a personal computer connected to a camera separate from the personal computer cause processing circuitry of the personal computer to perform a method comprising:

detecting a gesture made by a user based on an image of a predetermined portion of the user obtained by the camera;

outputting for a predetermined period of time, while in a normal mode, a moving image representative of the user's actual movement regarding the gesture made by the user;

recognizing, in response to output of the moving image representative of the user's actual movement regarding the gesture made by the user, a gesture command from the detected gesture;

determining whether or not the recognized gesture command has associated therewith a previously stored gesture command among a plurality of previously stored gesture commands by comparing the recognized gesture command to each of the plurality of previously stored gesture commands;

controlling operation of a first application and a second application; and outputting information associated with one or more of the first application and the second application, wherein, when the recognized gesture command is determined, based on the comparing the recognized gesture command to each of the plurality of previously stored gesture commands, to have associated therewith a previously stored gesture command while operation of the first application is controlled in a foreground, controlling operation of the second application operating in a background based on a control operation corresponding to the previously stored gesture command, except when the previously stored gesture command is a gesture command to switch modes, in which case a current mode is switched to a feedback mode if the current mode is the normal mode and is switched to the normal mode if the current mode is the feedback mode, when the recognized gesture command is determined, based on the comparing the recognized gesture command to each of the plurality of previously stored gesture commands, not to have associated therewith a previously stored gesture command while operation of the first application is controlled in the foreground, feeding back operation information to the user, when the recognized gesture command is determined, based on the comparison of the recognized gesture command to each of the plurality of previously stored gesture commands, to be the gesture command to switch modes and the current mode is the normal mode, the current mode is switched to the feedback mode and the operation information is fed back to the user, the operation information fed back to the user is fed back simultaneously while the circuitry is outputting information associated with the one or more of the first application and the second application and includes:

a list of possible gestures associated with the previously stored gesture commands based on the gesture or another gesture made by the user, a moving image representative of the user's actual movement regarding the gesture or another gesture made by the user, and a predetermined moving image for learning a gesture command corresponding to one of the plurality of previously stored gesture commands, and the gesture command to switch modes is the same gesture command to switch from the feedback mode to the normal mode and to switch from the normal mode to the feedback mode.

14. The non-transitory computer-readable medium according to claim 13, wherein said detecting the gesture made by the user includes detection of a predetermined portion of a hand of the user and calculation of a center of gravity of the portion of the hand.

15. The non-transitory computer-readable medium according to claim 13, wherein the detected gesture includes movement of the user's hand.

16. An information processing system comprising:

a personal computer connected to a camera separate from the personal computer, the personal computer having:

processing circuitry configured to:

detect a gesture made by a user based on an image of a predetermined portion of the user obtained by the camera;

output for a predetermined period of time, while in a normal mode, a moving image representative of the user's actual movement regarding the gesture made by the user;

recognize, in response to output of the moving image representative of the user's actual movement regarding the gesture made by the user, a gesture command from the detected gesture;

determine whether or not the recognized gesture command has associated therewith a previously stored gesture command among a plurality of previously stored gesture commands by comparing the recognized gesture command to each of the plurality of previously stored gesture commands;

store the plurality of previously stored gesture commands; and control operation of a first application and a second application, wherein the circuitry is further configured to output information associated with one or more of the first application and the second application, when the recognized gesture command is determined, by the circuitry based on the comparison of the recognized gesture command to each of the plurality of previously stored gesture commands, to have associated therewith a previously stored gesture command while the circuitry controls operation of the first application in a foreground, the circuitry controls operation of the second application operating in a background based on a control operation corresponding to the previously stored gesture command, except when the previously stored gesture command is a gesture command to switch modes, in which case the circuitry switches to a feedback mode if currently in the normal mode and switches to the normal mode if currently in the feedback mode, when the recognized gesture command is determined, by the circuitry based on the comparison of the recognized gesture command to each of the plurality of previously stored gesture commands, not to have associated therewith a previously stored gesture command while the circuitry controls operation of the first application in the foreground, operation information is fed back to the user, when the recognized gesture command is determined, by the circuitry based on the comparison of the recognized gesture command to each of the plurality of previously stored gesture commands, to be the gesture command to switch modes and the current mode is the normal mode, the current mode is switched to the feedback mode and the operation information is fed back to the user, the operation information fed back to the user is fed back simultaneously while the circuitry is outputting information associated with the one or more of the first application and the second application and includes:
- a list of possible gestures associated with the previously stored gesture commands based on the gesture or another gesture made by the user,
- a moving image representative of the user's actual movement regarding the gesture or another gesture made by the user, and
- a predetermined moving image for learning a gesture command corresponding to one of the plurality of previously stored gesture commands, and the gesture command to switch modes is the same gesture command to switch from the feedback mode to the normal mode and to switch from the normal mode to the feedback mode.

17. The information processing system according to claim 16, wherein the detection of the gesture by the user includes detection of a predetermined portion of a hand of the user and calculation of a center of gravity of the portion of the hand.

* * * * *